United States Patent [19]

De Rooij et al.

[11] 3,720,758
[45] March 13, 1973

[54] PROCESS FOR THE CONTINUOUS PREPARATION OF AN AQUEOUS SOLUTION OF A HYDROXYLAMMONIUM SALT

[75] Inventors: Abraham H. De Rooij, Geleen; Pierre A. M. Aggenbach, Brunssum, Netherlands

[73] Assignee: Stamicarbon N.V., Heerlen, Netherlands

[22] Filed: Sept. 21, 1970

[21] Appl. No.: 73,905

[30] Foreign Application Priority Data

Sept. 20, 1969 Netherlands .................... 6914306

[52] U.S. Cl. ............... 423/388, 260/566 A, 423/545
[51] Int. Cl. ...... C01c 1/24, C01c 1/00, C07c 131/10
[58] Field of Search..23/190 A, 117, 119; 260/566 A

[56] References Cited

UNITED STATES PATENTS 3,416,886  12/1968  Capaul et al. ..........................23/117

FOREIGN PATENTS OR APPLICATIONS 1,138,750  1/1969  Great Britain....................260/566 A
908,859  10/1962  Great Britain..........................23/119

Primary Examiner—Oscar R. Vertiz
Assistant Examiner—Hoke S. Miller
Attorney—Cushman, Darby & Cushman

[57] ABSTRACT

Hydroxylammonium salt solution prepared by catalytically reducing nitrate ions in aqueous solution using molecular hydrogen in a buffered reaction medium containing at least twice the number of sulphate ions as phosphate ions in which the ammonia produced as a by-product of the reaction is removed from the resulting solution as ammonium sulphate is disclosed.

5 Claims, 1 Drawing Figure

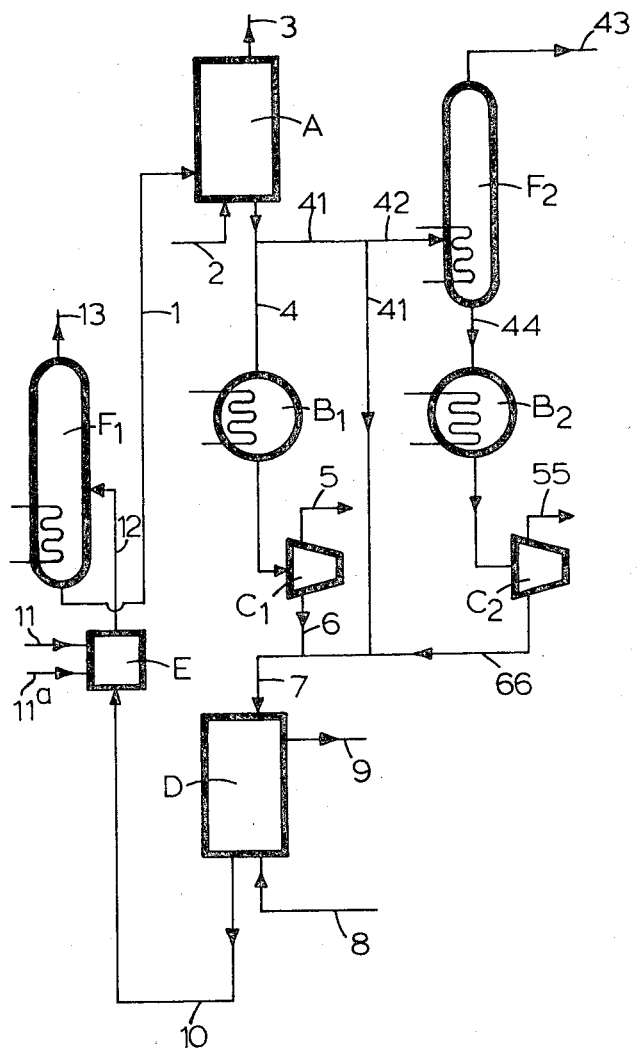

PROCESS FOR THE CONTINUOUS PREPARATION OF AN AQUEOUS SOLUTION OF A HYDROXYLAMMONIUM SALT

BACKGROUND OF THE INVENTION

This invention relates to an improved continuous process for the preparation of a hydroxylammonium salt in water by catalytic reduction of nitrate ions with the aid of molecular hydrogen in a medium buffered to a pH of 0 to 3, enabling the ammonia by-product formed in the hydroxylamine production to be separated from the solution in the form of the salt ammonium sulphate.

It is known that the catalytic reduction of nitrate ions is preferably carried out in the presence of a palladium catalyst, starting from make-up solutions which contain phosphoric acid or hydrogen sulphate in addition to relatively weak acids. Such a process is disclosed in U.S. Pat. No. 3,514,254. In this process reductions of nitrate ions to ammonium ions, nitrogen and nitrous oxide ($N_2O$) take place as secondary reactions. It has been found empirically that the chemical reactions taking place, if the process is carried out continuously at 25° C. with a palladium catalyst, can be represented approximately by the following gross equation, in which the formation of $N_2$ has been neglected:

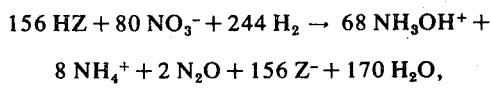

where Z stands for the $H_2PO_4$ or the $NH_4SO_4$ radical.

This shows that the reduction of nitrate ions converts about 80 percent of the nitrate ions into hydroxylamine and about 10 percent of the nitrate ions into ammonia. This ammonia must be removed from the hydroxylamine-containing solution leaving the reactor, if the hydroxylamine synthesis is to be part of a circulation process which is linked with an oxime synthesis zone. In this manner a constantly circulating process liquid, that is the hydroxylamine-containing process liquid obtained from the above reduction, is fed to the oxime synthesis zone, where the hydroxylamine in the form of a salt is consumed with liberation of the acid with which the hydroxylamine formed the hydroxylammonium salt thereby producing the oxime which is recovered, whereupon an acid-containing process liquid is recirculated to the hydroxylamine synthesis zone, where said acid again binds hydroxylamine freshly formed in the hydroxylamine synthesis zone. An example of such a process is disclosed in copending application Ser. No. 73,907 filed concurrently herewith.

In considering ways in which to remove the undesired ammonia, it would seem apparent that to allow the ammonia formed as a by-product of the production of hydroxylamine to crystallize out in the form of an ammonia salt and then to separate the crystals from the solution would effectively remove the unwanted ammonia. In the case of a hydroxylamine synthesis, when conducted in a medium containing phosphoric acid, it would then be possible to separate the primary ammonium phosphate prior to evaporation and cooling.

It is, however, not attractive to recover the ammonium phosphate in this manner, not only because it is present only in small quantities, but also because a quantity of relatively expensive pure phosphoric acid, which should be pure because it is intended for use in a catalytic process, is removed from the reaction mixture in the form of an ammonium salt. The phosphoric acid so removed in the form of primary ammonium phosphate has only the practical value of a fertilizer, such as the value of $P_2O_5$ in fertilizers containing ammonium phosphate, which are prepared with less expensive and less pure phosphoric acid. Moreover, in the rearrangement of cyclohexanone oxime to caprolactam, the ultimate commercial object of oxime production, a large quantity of ammonium sulphate is liberated, so that also in the hydroxylamine synthesis it would be preferable to recover ammonium sulphate as a by-product rather than the primary ammonium phosphate, or ammonium nitrate.

Apparently, it would therefore seem more attractive to carry out the hydroxylamine synthesis in a reaction medium which contains ammonium sulphate and ammonium hydrogen sulphate, so that the ammonium which is formed as a by-product of the hydroxylamine production could, indeed, be separated out from the reaction mixture in the form of ammonium sulphate rather than as ammonium phosphate.

However, it has been observed that such a hydroxylamine synthesis method wherein ammonium sulphate is recovered has the disadvantage that the catalyst customarily employed in the art, palladium, is less active and less selective in a reaction medium containing only ammonium sulphate and ammonium hydrogen sulphate than in a reaction medium containing only alkali metal or ammonium dihydrogen phosphate and phosphoric acid. It is for this reason that the method of using phosphate ions in the reaction medium is preferred. Furthermore, the subsequent oxime synthesis will also be carried out preferably with the aid of a solution containing hydroxylammonium dihydrogen phosphate rather than with a solution containing only hydroxylammonium-ammonium sulphate, in view of the more favorable pH conditions attendant with the use of hydroxylammonium dihydrogen phosphate permitting a higher efficiency.

DETAILED DESCRIPTION OF THE INVENTION

It has now been found that the ammonium ions formed as a by-product can also be separated out of the hydroxylamine synthesis reaction mixture as ammonium sulphate in a highly effective manner if the hydroxylamine synthesis is carried out in a reaction medium which contains both phosphoric acid, (or ammonium or alkali metal dihydrogen phosphate, as the case may be,) and sulphates, if said reaction medium contains a quantity of ammonium sulphate such that the molar ($\Sigma SO_4$)/$\Sigma PO_4$) ratio is at least 2. In this ratio $\Sigma SO_4$ represents the sum of all $SO_4$ radicals present in the reaction mixture, whether or not bound in the form of salts and $\Sigma PO_4$ represents the sum of all $PO_4$ radicals present in the reaction mixture, whether or not bound in the form of salts. In other words, sulphate ions are present in the reaction mixture in an amount at least twice as great as the phosphate ions.

In such a reaction medium having the desired $SO_4$/$PO_4$ ratio both the activity and selectivity of the palladium catalyst are still very satisfactory, while ammonium sulphate and not primary ammonium phosphate will crystallize out of the hydroxylammonium salt solution upon cooling, or evaporation and cooling.

It has also been found that when using a hydroxylammonium salt solution which, in addition to $PO_4$, also contains $SO_4$ in the above ratio, the pH conditions in the subsequent oxime synthesis are more suitable than in a corresponding oxime synthesis when using a hydroxylammonium salt solution which contains only the sulphate ions.

Another advantage is that due to the relatively high sulphate content of the hydroxylamine-containing circulating liquid when practicing the present invention, the oxime synthesis can be carried out more economically by reacting the cyclohexanone to be converted to the corresponding amine with the aqueous hydroxylamine solution in counter-currents and thereby avoiding the usual application of a non-water-miscible or poorly water-miscible organic solvent for cyclohexanone and cyclohexanone oxime. Expensive solvent recovery procedures known in the art are thus obviated. Such a method has been disclosed in copending application Ser. No. 73,906 filed concurrently herewith, the disclosure of which is hereby incorporated by reference.

The crystallization point of the reaction mixture directly affects the facility of ammonium sulphate removal. If the hydroxylamine synthesis solution obtained under the usual process conditions (having a pH of about 1.5-2) has a high crystallization point, for instance, about 60 °C, ammonium sulphate can be separated out by simple cooling and at a suitable molar $(\Sigma SO_4)/\Sigma PO_4)$ ratio of about 2. However, if the solution has a lower crystallization point, for example, of about 45 °C, then either the solution must first be concentrated and then cooled, or the molar $(\Sigma SO_4)/(\Sigma PO_4)$ ratio has to be considerably higher than 2 to allow ammonium sulphate to be separated out. Thus the best separation of ammonium sulphate is attained using solutions having crystallization points from about 45° to 60 °C; however crystallization points may vary in wide ranges, as for example from about 20° to 90 °C. However, the crystallization point of the resulting solution need not be a limiting factor, for the solution can easily be concentrated, as hereinafter described, and the ammonium sulphate removed from the concentrated solution.

It is also possible both to maintain a much higher $(\Sigma J SO_4)/(\Sigma PO_4)$ ratio and to concentrate the solution before cooling, especially if ammonium sulphate is to be crystallized out of a solution with a particularly low crystallization point, for example of about 20° – 30 °C. The resulting hydroxylammonium phosphate solution is suitable as such to be converted, by reaction with cyclohexanone, directly to cyclohexanone oxime e.g. according to the process described in U.S. Pat. No. 3,429,920, the disclosure of which is hereby incorporated by reference.

Reaction parameters are well known for this synthesis and are disclosed in U.S. Pat. No. 3,514,254, the disclosure of which is hereby incorporated by reference. The catalyst concentration, temperature and pressure of the reaction may vary widely without rendering the reaction impossible or causing the resulting hydroxylamine to decompose. For instance, the catalyst may range from 0.001 – 0.1 gram of a noble metal per gram of nitrate. The temperature may be maintained between the freezing point and about 125° C.; however the ambient or slightly higher (20°–60° C.) temperatures are preferred. The pressure may be atmospheric, but a pressure of 5 atm. is commercially attractive. Operation outside these preferred ranges does not affect the principles of the invention but generally will only add to the cost of the process.

One embodiment of the process according to the invention is shown schematically in the accompanying drawing.

In this drawing, A is the hydroxylamine synthesis reactor, to which the phosphoric acid solution containing the nitrate and sulphate ions is fed through a pipe 1. These nitrate ions are reduced by means of hydrogen supplied through a pipe 2; the waste gases are discharged through a pipe 3 and the hydroxylammonium salt solution thus produced containing ammonium sulphate and alkali metal or ammonium dihydrogen phosphate is fed, through a pipe 4, to a cooler B1, where the solution becomes supersaturated in ammonium sulphate. A suspension of ammonium sulphate crystals is fed from the cooler B1 to a separator C1, for instance a centrifuge, where the ammonium sulphate crystals are separated from the mother liquor containing the hydroxylammonium salt. The crystals leave the system through a pipe 5; the mother liquor is fed, through piping 6-7, to an oxime synthesis reactor D, where, combining with cyclohexanone supplied through a pipe 8, it forms the oxime, which leaves the system through a pipe 9.

A solution virtually exhausted in hydroxylammonium salt is fed through a pipe 10 to a mixing vessel E, which further receives nitric acid through a pipe 11 and sulfuric acid through a pipe 11a, whereupon the mixture is fed, through a pipe 12, to an evaporator F1. In this evaporator the reaction water formed during the hydroxylamine synthesis and the oxime synthesis, and the water introduced with the nitric acid, is evaporated, to be discharged through a pipe 13, while a solution suitable for use in the hydroxylamine synthesis is fed from the evaporator F1 to the hydroxylamine synthesis reactor A through pipe 1.

Instead of supplying make-up nitric acid, it is also possible to introduce nitric vapors through pipe 11, so that nitric acid is formed in situ in the mixing vessel E, which in this case should of course be an absorption column (not shown).

If the solution leaving reactor A has such a concentration that ammonium sulphate cannot be separated from it by simple cooling, a certain portion of this solution may first be split off, then concentrated, and the required quantity of ammonium sulphate separated from the concentrated solution.

With this alternative method, the hydroxylammonium salt solution obtained in reactor A is carried off through a pipe 41; part of this solution is fed, through a pipe 42, to an evaporator F2, water vapor is discharged through a pipe 43, and the concentrated solution is fed, through a pipe 44 to a cooler B2, from where a suspension of crystals is fed to a centrifuge C2, where it is separated into crystals which are carried off through a pipe 55, and mother liquor, which is carried off through a pipe 66 and added to the solution flowing through pipe 41, to be fed, through pipe 7, to the oxime synthesis reactor D.

With the process represented in the embodiment of the invention shown in the drawing, ammonium sulphate crystals are separated from the solution flowing from the hydroxylamine synthesis reactor A to the oxime synthesis reactor D. These ammonium sulphate crystals could also be separated from the solution flowing from the oxime synthesis reactor D to the hydroxylamine synthesis reactor A. However, preference is given to the process shown in the drawing, because here the solution is not yet diluted with the reaction water formed in the oxime synthesis reactor, so that the $(NH_4)_2SO_4$ crystals will form more readily and are therefore more easily removed.

The present invention is also illustrated by the following examples with reference to the drawing in which, unless otherwise indicated, all parts and percentages are by weight.

Example I describes a solution from which ammonium sulphate crystallizes out immediately upon cooling; example II describes a solution which must first be concentrated before the formation of ammonium sulphate crystals which are subsequently recovered on cooling.

EXAMPLE I

A hydroxylamine salt solution is prepared and continuously fed into reactor A, with the aid of a palladium-loaded activated carbon catalyst and a molar excess of molecular hydrogen representing about 900 moles, from a solution having the following molar composition: 85 $H_3PO_4$, 85 $NH_4HSO_4$, 140 $NH_4NO_3$, 125 $(NH_4)_2SO_4$ and 1545 $H_2O$. The reaction mixture is retained for 0.5 hours in reactor A at a pH of about 1.5–2 and a temperature of 80 °C. The hydroxylamine salt solution thus obtained has the following molar composition: 30 $H_3PO_4$, 70 $NH_4NO_3$, 210 $(NH_4)_2SO_4$, 55 $NH_3OHH_2PO_4$ and 1,800 $H_2O$ and a crystallization temperature of about 60 °C. Gaseous components, mainly hydrogen, the remainder nitrogen and nitrogen oxides were discharged through waste gas conduit 3. The entire quantity of hydroxylamine salt solution produced is cooled in cooler B1 to about 30 °C.

An amount of 7.5 moles of $(NH_4)_2SO_4$ crystallizes out of this solution. The crystallized $(NH_4)_2SO_4$ is separated from the hydroxylamine salt solution by means of a centrifuge C1. In the oxime synthesis reactor D cyclohexanone oxime is prepared as described in copending application Ser. No. 73,906 filed concurrently herewith by addition of 55 moles of cyclohexanone. After removal of 55 moles of the oxime, nitric acid and sulphuric acid are added, in mixer E, to the hydroxylamine-free solution thus obtained. The quantity of nitric acid added is equivalent to the quantity previously converted in reactor A namely 70 moles, and is conveniently in the form of a 55 percent-by-weight aqueous solution of nitric acid, and 7.5 moles of sulphuric acid is also added in the form of a 95 percent-by-weight aqueous solution of the acid, which is also equivalent to the quantity of $(NH_4)_2SO_4$ crystals previously separated from the circulating liquid.

In an evaporator F1 the reaction water is removed from the circulating liquid and the volume thereof is reduced, whereupon the resulting solution, suitable for the hydroxylamine synthesis, is fed back to reactor A for further hydroxylamine synthesis.

EXAMPLE II

A hydroxylamine salt solution is prepared in reactor A, in a similar manner as in example I, with the aid of a palladium-loaded activated carbon catalyst and hydrogen, from a solution having the following molar composition: 100 $H_3PO_4$, 100 $NH_4HSO_4$, 100 $NH_4NO_3$, 100 $(NH_4)_2SO_4$ and 1,700 $H_2O$. The reaction mixture is retained in reactor A for a period of 0.5 hours at 60 °C. at a pH of 1.5 – 2 in the presence of 988 moles of molecular hydrogen. The hydroxylamine salt solution thus obtained has the following molar composition: 44 $H_3PO_4$, 22 $NH_4NO_3$, 191 $(NH_4)_2SO_4$, 56 $NH_3OHH_2PO_4$, 9 $NH_3OHNH_4SO_4$ and 1,869 $H_2O$ and a crystallization temperature of about 45° C.

From a portion of the above reaction mixture 127 moles of water is evaporated in evaporator F2. The concentrated solution has the following molar composition: 12 $H_3PO_4$, 6 $NH_4NO_3$, 52 $(NH_4)_2SO_4$, 15 $NH_3OHH_{24}$, 2 $NH_3OHNH_4SO_4$ and 378 $H_2O$, and a crystallization temperature of about 55 °C. The solution is then cooled in a cooler-crystallizer B2 to about 30 °C, as a result of which 6.5 moles of $(NH_4)_2SO_4$ crystallize out. The crystals are separated from the hydroxylamine-containing solution in centrifuge C2. The part-stream thus obtained is now added to and mixed with the main stream, and cyclohexanone oxime is prepared by adding 65 moles of cyclohexanone to the solution containing hydroxylamine. The oxime formation proceeds substantially as described in British Pat. No. 1,138,750; 65 moles of the oxime are recovered.

Nitric and sulphuric acid are added to the solution exhausted in hydroxylamine which leaves the oxime synthesis reactor D. In mixer E 78 moles of $HNO_3$ are added, conveniently in the form of a 55 percent-by-weight aqueous solution of the acid, this quantity equivalent to the quantity previously converted in the hydroxylamine synthesis reactor, and 6.5 moles of sulphuric acid, in the form of a 95 percent-by-weight aqueous solution of the acid, which is equivalent to the quantity previously separated in the form of $(NH_4)_2SO_4$ crystals. In an evaporator F1 the reaction water and the quantity of water added with the nitric and sulphuric acids is removed from the circulating liquid, whereupon a suitable starting solution for the hydroxylamine synthesis is fed back to the synthesis reactor A.

We claim:

1. In a continuous process for the preparation of an aqueous solution containing hydroxylammonium salt in a reaction zone, wherein nitrate ions in an acidic aqueous reaction medium buffered to a pH of 0–3 in said reaction zone are reduced by molecular hydrogen in the presence of a catalyst at a temperature above at least the freezing point of the reaction medium with the formation of ammonium ions as a by-product of said process, the improvement wherein both sulphate and phosphate ions are present in said reaction medium, the molar ratio of said sulphate ions and
phosphate ions present expressed as:

$$(\Sigma SO_4)/(\Sigma PO_4)$$

is at least 2, and
said ammonium ions thus formed and present in said aqueous solution containing hydroxylammonium salt are separated therefrom in the form of solid ammonium sulphate.

2. A continuous process for the preparation of an aqueous solution containing hydroxylammonium salt in a reaction zone A wherein nitrate ions in an acidic aqueous reaction medium buffered to a pH of 0-3 in said reaction zone are reduced by molecular hydrogen in the presence of a catalyst at a temperature above at least the freezing point of the reaction medium with the formation of ammonium ions as a by-product of said process, the process including both sulphate and phosphate ions present in said reaction medium, the molar ratio of said sulphate ions and phosphate ions present expressed as:

$$(\Sigma SO_4)/(\Sigma PO_4)$$

is at least 2, and
said ammonium ions thus formed and present in said aqueous solution containing hydroxylammonium salt are separated therefrom in the form of solid ammonium sulphate, said reaction zone A for the preparation of hydroxylammonium salt is in fluid communication with a reaction zone B for the synthesis of cyclohexanone oxime, in said reaction zone B cyclohexanone is continuously contacted in counter current with an aqueous solution comprising said hydroxylammonium salt, and a circulating aqueous solution passes from reaction zone A to reaction zone B and returns to reaction zone A, wherein:

a. said circulating aqueous solution is enriched in hydroxylammonium salt in reaction zone A and conducted to reaction zone B, b. said hydroxylammonium salt, when reacted with cyclohexanone, is decomposed into cyclohexanone oxime and an acid in reaction zone B, c. said acid produced in step (b) together with said circulating liquid is returned to reaction zone A where it is again enriched in hydroxylammonium salt, the improvement wherein said ammonium ions formed as a by-product of the hydroxylammonium salt synthesis are continuously separated from said circulating liquid in the form of ammonium sulphate crystals.

3. The process of claim 2 wherein said ammonium sulphate crystals are separated from that portion of said circulating liquid flowing to reaction zone B for the synthesis of cyclohexanone oxime.

4. The process of claim 1 wherein said separation of ammonium sulphate is effected by cooling said aqueous solution containing the hydroxylammonium salt.

5. The process of claim 4 wherein said aqueous solution is concentrated by evaporation before cooling.

* * * * *